(12) United States Patent
Ienaga et al.

(10) Patent No.: US 10,189,356 B2
(45) Date of Patent: Jan. 29, 2019

(54) VEHICLE CONTROL DEVICE AND VEHICLE CONTROL METHOD

(71) Applicant: FUJI JUKOGYO KABUSHIKI KAISHA, Tokyo (JP)

(72) Inventors: Hiroshi Ienaga, Tokyo (JP); Takeshi Yoneda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 98 days.

(21) Appl. No.: 15/392,397

(22) Filed: Dec. 28, 2016

(65) Prior Publication Data

US 2017/0246957 A1    Aug. 31, 2017

(30) Foreign Application Priority Data

Feb. 25, 2016 (JP) ................. 2016-034296

(51) Int. Cl.
*B60L 3/10*    (2006.01)
*B60K 1/02*    (2006.01)
*B60L 15/02*   (2006.01)
*B60L 15/20*   (2006.01)
(Continued)

(52) U.S. Cl.
CPC ............. *B60L 3/102* (2013.01); *B60K 1/02* (2013.01); *B60K 7/0007* (2013.01); *B60K 17/356* (2013.01); *B60L 15/025* (2013.01); *B60L 15/20* (2013.01); *B60L 2007/0092* (2013.01); *B60L 2240/421* (2013.01); *B60L 2240/423* (2013.01); *B60Y 2200/91* (2013.01); *B60Y 2300/82* (2013.01); *Y02T 10/7258* (2013.01)

(58) Field of Classification Search
None
See application file for complete search history.

(56) References Cited

U.S. PATENT DOCUMENTS

2001/0025219 A1 * 9/2001 Ohba .................... B60K 6/365
                                                                701/89

FOREIGN PATENT DOCUMENTS

JP    2001-225658 A    8/2001
JP    2002-067723 A    3/2002

OTHER PUBLICATIONS

Office Action received for Japanese Patent Application No. 2016-034296, dated Sep. 26, 2017, 04 pages of Office Action and 04 pages of English Translation.

* cited by examiner

*Primary Examiner* — Mussa A Shaawat
*Assistant Examiner* — Michael V Kerrigan
(74) *Attorney, Agent, or Firm* — Chip Law Group

(57) ABSTRACT

A vehicle control device includes: a slip determination module that determines a slip of each of wheels; a base distribution calculation module that calculates a base distribution torque to be distributed to the front and rear wheels on the basis of requested torques and a base distribution ratio of torques between the front and rear wheels, and changes the base distribution ratio on the basis of a result of slip determination performed by the slip determination module when the slip is detected; a rotation speed control module that decreases the base distribution torque on the basis of the result of slip determination, in a manner that a rotation speed of a slipping wheel that is slipping becomes equal to a target rotation speed; and a torque vectoring module that redistributes a torque down amount of the slipping wheel to the base distribution torque of non-slipping wheels that are not slipping.

16 Claims, 7 Drawing Sheets

(51) Int. Cl.
*B60K 7/00* (2006.01)
*B60K 17/356* (2006.01)

VEHICLE CONTROL DEVICE AND VEHICLE CONTROL METHOD

CROSS-REFERENCE TO RELATED APPLICATIONS

The present application claims priority from Japanese Patent Application No. 2016-034296 filed on Feb. 25, 2016, the entire contents of which are hereby incorporated by reference.

BACKGROUND

1. Technical Field

The present invention relates to vehicle control devices and vehicle control methods.

2. Related Art

In the related art, for example, Japanese Unexamined Patent Application Publication (JP-A) No. 2002-067723 describes that a non-slipping wheel torque to be output to driving wheels that are not slipping is set by setting a slipping wheel torque for a driving wheel that is slipping and subtracting the slipping wheel torque from a driving axis requesting torque.

However, according to the technology described in JP-A No. 2002-067723, a front shaft and a rear shaft are driven by a motor MG2 that drives the front shaft and a motor MG3 that drives the rear shaft, and it is not assumed to control torques of a front left wheel, a front right wheel, a rear left wheel, and a rear right wheel. Therefore, it is difficult to optimally control a slip in each of the front left wheel, front right wheel, rear left wheel, and rear right wheel in accordance with a slip state of each of the wheels.

In addition, when it is assumed to decrease a torque of a wheel that is slipping and redistribute the torque down amount to torques of wheels that are not slipping, for example, when front-and-rear distribution which is a base of front wheels and rear wheels is extremely biased toward the front wheels or the rear wheels, a torque vectoring amount at the time when a slip occurs increases. Therefore, vibration occurs when a motor rotates, and ride quality decreases unfortunately. In addition, when the torque down amount or the torque vectoring amount at the time of slip is limited to prevent such problems, slip suppression performance may decreases, or vehicle driving power may decrease unfortunately.

SUMMARY OF THE INVENTION

Accordingly, it is desirable to provide a novel and improved vehicle control device and vehicle control method that are capable of suppressing decrease in drivability even when torque vectoring amounts of front and rear wheels are large when a slip occurs.

An aspect of the present invention provides a vehicle control device including: a slip determination module that determines a slip of each of a front left wheel, a front right wheel, a rear left wheel, and a rear right wheel; a base distribution calculation module that calculates a base distribution torque to be distributed to the front and rear wheels on the basis of requested torques and a base distribution ratio of torques between the front and rear wheels, and changes the base distribution ratio on the basis of a result of slip determination performed by the slip determination module when the slip is detected; a rotation speed control module that decreases the base distribution torque on the basis of the result of slip determination performed by the slip determination module, in a manner that a rotation speed of a slipping wheel that is slipping becomes equal to a target rotation speed; a torque vectoring module that redistributes a torque down amount of the slipping wheel that is slipping to the base distribution torque of non-slipping wheels that are not slipping; and the base distribution calculation module changes the base distribution ratio of torques based on an actual distribution ratio of torques, between the front and rear wheels, before and after the decrease of the base distribution torque by rotation speed control module.

The base distribution calculation module may set the base distribution ratio to an efficiency-oriented distribution ratio before the slip is detected, and change the base distribution ratio into a stability-oriented distribution ratio after the slip is detected.

The torques may be distributed while biased toward the front wheels or the rear wheels in a case of the efficiency-oriented distribution ratio.

The torques may be distributed on the basis of a weight distribution proportion in a case of the stability-oriented distribution ratio.

The base distribution calculation module may set the base distribution ratio to the actual distribution ratio of torques between the front and rear wheels until the actual distribution ratio reaches the stability-oriented distribution ratio after the slip is detected.

The base distribution calculation module may set the base distribution ratio to the stability-oriented distribution ratio after the actual distribution ratio of torques between the front and rear wheels reaches the stability-oriented distribution ratio after the slip is detected.

The base distribution calculation module may change the base distribution ratio back to the efficiency-oriented distribution ratio after slip end determination.

The torque vectoring module may acquire the base distribution torque of the respective wheels, and add the torque down amount to the base distribution torque of the non-slipping wheels.

With regard to the non-slipping wheels, the torque vectoring module may evenly redistribute, to the non-slipping wheels, a value obtained by dividing a sum of the torque down amount of the slipping wheel by the number of the non-slipping wheels.

Another aspect of the present invention provides a vehicle control method including: determining a slip of each of wheels; calculating a base distribution torque to be distributed to the front and rear wheels on the basis of requested torques and a base distribution ratio of torques between the front and rear wheels, and changing the base distribution ratio on the basis of a result of the slip determination when the slip is detected; decreasing the base distribution torque on the basis of the result of the slip determination in a manner that a rotation speed of a slipping wheel that is slipping becomes equal to a target rotation speed; and redistributing a torque down amount of the slipping wheel that is slipping to the base distribution torque of non-slipping wheels that are not slipping.

DETAILED DESCRIPTION

Figure 1:
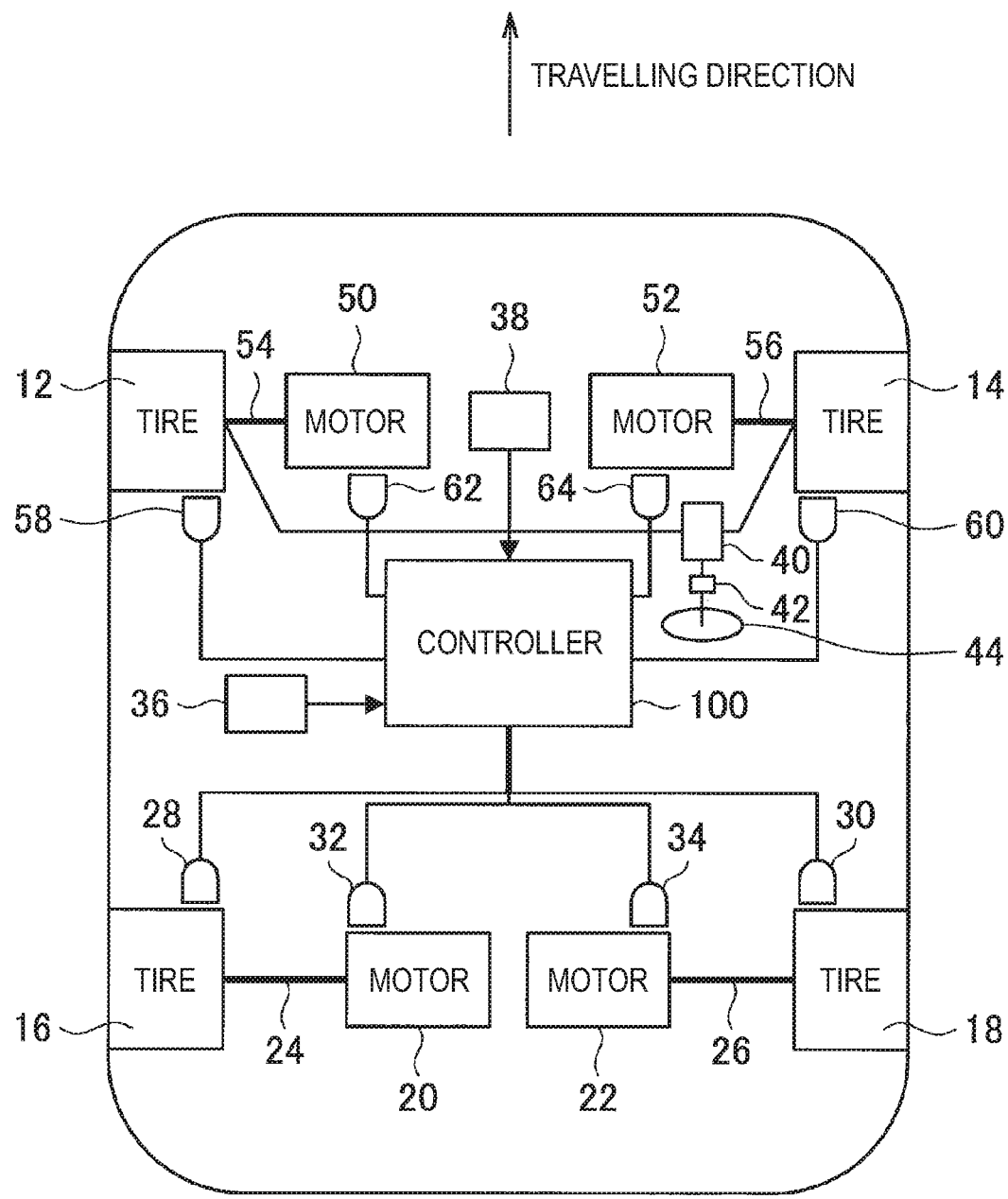
FIG. 1 is a schematic diagram illustrating a configuration of a vehicle according to an implementation of the present disclosure.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

First, with reference to FIG. 1, the configuration of a vehicle 500 according to the implementation of the present invention will be described. FIG. 1 is a schematic diagram illustrating the configuration of the vehicle 500 according to the implementation of the present disclosure. As illustrated in FIG. 1, the vehicle 500 includes four tires (wheels) 12, 14, 16 and 18 including front and rear wheels, a vehicle control device (controller) 100, two motors (drive units) 20 and 22 that control the rotation of the respective rear wheel tires 16 and 18, drive shafts 24 and 26 that couple the respective motors 20 and 22 to the respective tires 16 and 18, deceleration mechanisms (not illustrated) that decelerate the rotation of the respective motors 20 and 22 and transmits the decelerated rotation to the drive shafts 24 and 26, wheel speed sensors 28 and 30 that detect wheel speeds of the respective rear wheel tires 16 and 18 from the rotation thereof, motor rotation speed sensors 32 and 34 that detect rotation speeds of the respective motors 20 and 22, an acceleration sensor 36, and a yaw rate sensor 38. The vehicle 500 further includes, as in the rear wheel part, two motors (drive units) 50 and 52 that control the rotation of the respective front wheel tires 12 and 14, drive shafts 54 and 56 that couple the respective motors 50 and 52 to the respective tires 12 and 14, wheel speed sensors 58 and 60 that detect wheel speeds of the respective front wheel tires 12 and 14 from the rotation thereof, and motor rotation speed sensors 62 and 64 that detect rotation speeds of the respective motors of the front wheels. The wheel speed sensors of the respective wheels detect tire rotation speeds (wheel speeds) N_wheel (FL, FR, RL, RR) of the respective wheels. The motor rotation speed sensors of the respective wheels detect motor rotation speeds N_motor (FL, FR, RL, RR) of the respective wheels. The vehicle 500 further includes a power steering mechanism (P/S) 40, a steering angle sensor 42, and a steering wheel 44 that operates steering angles of the respective front wheel tires 12 and 14. The vehicle 500 is configured as an electric vehicle that independently drives the four tires (12, 14, 16, and 18).

Figure 2:
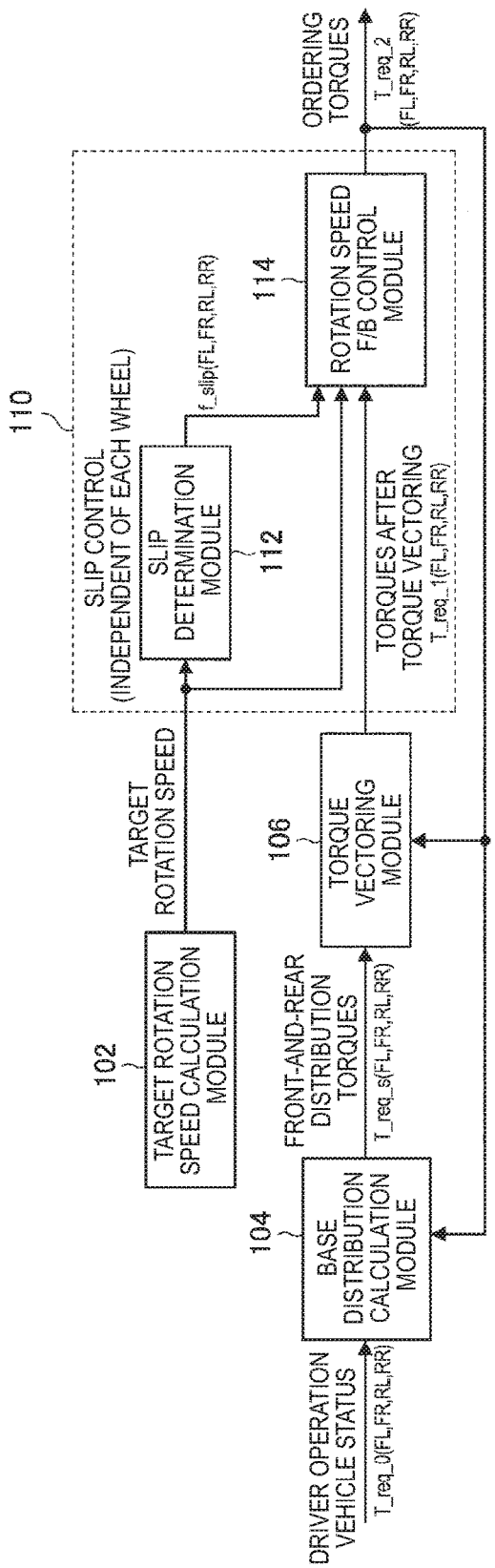
FIG. 2 is a schematic diagram illustrating a main configuration of a vehicle control device according to the implementation.

FIG. 2 is a schematic diagram illustrating a main configuration of the vehicle control device 100 according to the implementation. As illustrated in FIG. 2, the control device 100 includes a target rotation speed calculation module 102, the base distribution calculation module 104, a torque vectoring module (redistribution control module) 106, and a rotation speed control module 110. The rotation speed control module 110 includes a slip determination module 112 and a rotation speed feedback (F/B) control module (rotation speed control module) 114. Such structural elements illustrated in FIG. 2 can be configured by a circuit (hardware) or a central processing unit such as a CPU and a program (software) for causing it to function.

As illustrated in FIG. 2, first, high-level requested torques T_req_0 (FL, FR, RL, RR) of respective wheels are calculated on the basis of a vehicle status such as an accelerator position, a brake operation amount, and a steering wheel steering angle, and input to the base distribution calculation module 104. FL represents the front left wheel, FR represents the front right wheel, RL represents the rear left wheel, and RR represents the rear right wheel.

The base distribution calculation module 104 calculates front-and-rear distribution torques T_req_s (FL, FR, RL, RR) of the respective wheels by calculating a base front axis distribution ratio Rb and distributing the requested torques T_req_0 (FL, FR, RL, RR) of the respective wheels to the front and rear wheels in accordance with the base front axis distribution ratio Rb. The base distribution calculation module 104 also calculates an actual front axis distribution ratio Ra (to be described later).

The torque vectoring module 106 finds a total torque down amount of the four wheels and vectors (adds) a torque to a wheel whose torque has not decreased. The torque vectoring will be described later.

The rotation speed control module 110, the torque vectoring module (redistribution control module) 106, and the target rotation speed calculation module 102 constitute a slip control system of the respective wheels according to the implementation. In the implementation, when the motor of each wheel is driven by high-level requested torque T_req_0 and a slip occurs on each wheel, the slip control system performs control so that the slip can be surely suppressed. In this slip control system, rotation speed control is independently performed for each wheel, and by using the result of the rotation speed control, torque redistribution control is performed; thus, the driving power and stability as high as those of a diff-lock are secured. More specifically, a state in which a vehicle body speed does not match a wheel speed is considered as a slip state, and the driving power and stability are secured by suppressing (limiting differential) an independent slip in each wheel.

Figure 3:
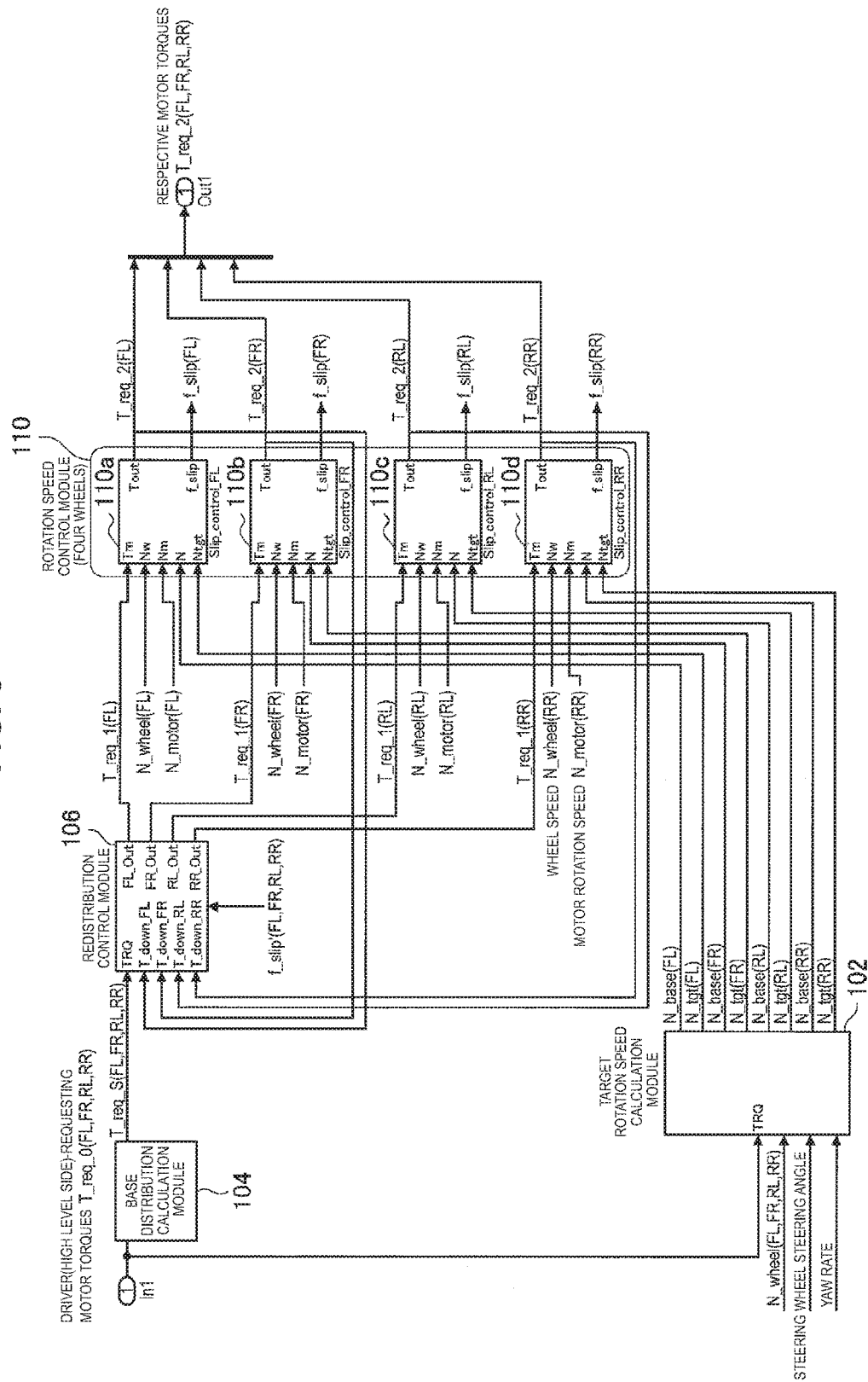
FIG. 3 is a block diagram specifically illustrating a rotation speed control module, a torque vectoring module (redistribution control module), and a target rotation speed calculation module.

FIG. 3 is a block diagram specifically illustrating the rotation speed control module 110, the torque vectoring module (redistribution control module) 116, and the target rotation speed calculation module 102. With reference to FIG. 3, the configuration of the vehicle control device 100 according to the implementation will be described below in detail. The target rotation speed calculation module 102 receives the tire rotation speeds N_wheel (FL, FR, RL, RR) of the respective wheels, the steering wheel steering angle, the yaw rate, and the high-level requested torque T_req_0. The target rotation speed calculation module 102 sets, as a base rotation speed N_base_0, the lowest tire rotation speed among tire rotation speeds N_wheel (FL, FR, RL, RR) of the respective wheels. When it is determined that regeneration is performed from the high-level requested torque T_req_0, the target rotation speed calculation module 102 sets, as the base rotation speed N_base_0, the highest tire rotation speed among tire rotation speeds N_wheel (FL, FR, RL, RR) of the respective wheels.

The target rotation speed calculation module 102 calculates base rotation speeds N_base (FL, FR, RL, RR) of the respective wheels on the basis of the base rotation speed N_base_0, the steering wheel steering angle, the yaw rate, and the like. In this case, the target rotation speed calculation module 102 calculates a slipping angle of the body from the base rotation speed N_base_0, the steering wheel steering angle, and the yaw rate, and calculates the base rotation speeds N_base (FL, FR, RL, RR) of the respective wheels from the slipping angle of the body, vehicle parameters (front and rear treads, a wheel base, the distance between the center of gravity and the front axle, and a distance between the center of gravity and the rear axle), and the base rotation speed N_base_0. The base rotation speeds N_base (FL, FR, RL, RR) of the respective wheels correspond to the rotation speeds in the case where a slip does not occur, which are used as a base rotation speed for slip determination. In addition, the target rotation speed calculation module 102 calculates target rotation speeds N_tgt (FL, FR, RL, RR) of the respective wheels from the base rotation speeds N_base (FL, FR, RL, RR) of the respective wheels and a target slip ratio. In this case, the target rotation speed calculation module 102 compares, for each wheel, the product obtained by multiplying the base rotation speeds N_base (FL, FR, RL, RR) by the target slip ratio with the sum of the base rotation speeds N_base (FL, FR, RL, RR) and a target rotation difference, and sets the highest value (the lowest value at the time of regeneration) as N_tgt (FL, FR, RL, RR) of each wheel. The target rotation speeds N_tgt (FL, FR, RL, RR) of the respective wheels are target rotation speeds obtained on the assumption that a slip may occur. The target rotation speed calculation module 102 outputs the calculated base rotation speeds N_base (FL, FR, RL, RR) of the respective wheels and the target rotation speeds N_tgt (FL, FR, RL, RR) of the respective wheels to the rotation speed control module 110.

As described above, the torque vectoring module 106 receives the front-and-rear distribution torques T_req_s (FL, FR, RL, RR) after the high level requested torques T_req_0 are distributed to the front and rear wheels. In addition, the torque vectoring module 106 receives slip determination flags f_slip' of the respective wheels in a previous control cycle. The torque vectoring module 106 controls torques of the respective wheels by calculating torque down amounts T_down (FL, FR, RL, RR) of the respective wheels in the previous control cycle and redistributing a sum of the torque down amounts to a wheel that is not slipping on the basis of the torque down amounts T_down (FL, FR, RL, RR) in the previous control cycle.

Specifically, in the case where one or more of the wheels have been slipping in the previous control cycle, the torque vectoring module 106 finds a sum T_down_total of the torque down amounts (previous values) T_down' of the wheels that have been slipping. Next, the torque vectoring module 106 distributes the sum T_down_total of the torque down amounts at a certain rate to wheels that are not slipping in a current control cycle, and sets requested torques T_req_1 from the respective wheels to the rotation speed control module 110, to values obtained by adding front-and-rear distribution torques T_req_s (FL, FR, RL, RR) to the distribution results. For example, the torque vectoring module 106 calculates the requested torques (torques after torque vectoring) T_req_1 (FL, FR, RL, RR) of the respective wheels by evenly distributing the sum T_down_total of the torque down amounts to the non-slipping wheels in the current control cycle and adding the front-and-rear distribution torques T_req_s (FL, FR, RL, RR) to them.

On the other hand, the torque vectoring module 106 does not distributes the sum T_down_total of the torque down amounts to a wheel that is slipping in the current control cycle, and sets the front-and-rear distribution torques T_req_s (FL, FR, RL, RR) to the requested torques T_req_1 to the rotation speed control module 110.

In such a way, the calculated requested torques T_req_1 (FL, FR, RL, RR) of the respective wheels are input to the rotation speed control module 110. The rotation speed control module 110 receives the target rotation speeds N_tgt (FL, FR, RL, RR) of the respective wheels and the base rotation speeds N_base (FL, FR, RL, RR) of the respective wheels calculated by the target rotation speed calculation module 102. In addition, the rotation speed control module 110 receives motor rotation speeds N_motor (FL, FR, RL, RR) of the respective wheels and tire rotation speeds N_wheel (FL, FR, RL, RR) of the respective wheels.

By use of the inputted requested torques T_req_1 (FL, FR, RL, RR) of the respective wheels, target rotation speeds N_tgt (FL, FR, RL, RR) of the respective wheels, base rotation speeds N_base (FL, FR, RL, RR) of the respective wheels, motor rotation speeds N_motor (FL, FR, RL, RR) of the respective wheels, tire rotation speeds N_wheel (FL, FR, RL, RR) of the respective wheels, and the like, the rotation speed control module 110 controls the rotation speeds, and outputs the results as final requested torques T_req_2 (FL, FR, RL, RR) of motors of the respective wheels. The rotation speed control module 110 includes a rotation speed control module 110a that calculates a requested torque T_req_2(FL) to a motor of a front left wheel (FL), a rotation speed control module 110b that calculates a requested torque T_req_2(FR) to a motor of a front right wheel (FR), a rotation speed control module 110c that calculates a requested torque T_req_2(RL) to a motor of a rear left wheel (RL), and a rotation speed control module 110d that calculates a requested torque T_req_2(RL) to a motor of a rear left wheel (RL).

As illustrated in FIG. 2, the rotation speed control module 110 includes the slip determination module 112, and the rotation speed feedback (F/B) control module 114. Each of the rotation speed control modules 110a to 110d includes the slip determination module 112 and the rotation speed feedback (F/B) control module 114. Here, control of the front left wheel (FL) is taken as an example. The rotation speed control module 110a receives the requested torque T_req_1 (FL) of the front left wheel, the base rotation speed N_base (FL) of the front left wheel, the target rotation speed N_tgt (FL) of the front left wheel, the motor rotation speed N_motor (FL) of the front left wheel, and the tire rotation speed N_wheel (FL) of the front left wheel. The rotation speed control modules 110b, 110c, and 110d each performs a process similar to the case of the rotation speed control module 110a.

The slip determination module 112 performs slip determination on the basis of a deviation degree between the motor rotation speed N_motor (FL) and the base rotation speed N_base (FL). In the case where the front left wheel is slipping, the slip determination module 112 turns on a slip determination flag f_slip (FL) (f_slip (FL)=1). As described above, the base rotation speed N_base (FL) corresponds to the rotation speed when a slip is not generated, and thus, in a case where the base rotation speed N_base (FL) deviates from the motor rotation speed N_motor (FL) by a predetermined value or more, it is determined that a slip is occurring. The tire rotation speed N_wheel (FL) of the front left wheel, which is inputted to the slip determination module 112, can be used mainly for slip end determination. In a case where the tire rotation speed N_wheel (FL) equals to or close to the base rotation speed N_base (FL), it can be determined that the slip is converged.

In the case where the front left wheel is not slipping, the rotation speed control module 110a outputs the requested torque T_req_1 (FL) of the front left wheel input from the torque vectoring module 106, as a final requested torque T_req_2 (FL) to the motor of the front left wheel, on the basis of the slip determination flag f_slip (FL).

In the case where the front left wheel is slipping, the rotation speed control module 110a controls a rotation speed with respect to the requested torque T_req_1 (FL) of the front left wheel input from the torque vectoring module 106 on the basis of the slip determination flag f_slip (FL), and outputs the requested torque T_req_2 (FL) to the motor of the front left wheel. The rotation speed control module 110a determines that the target rotation speed N_tgt (FL) does not match the motor rotation speed N_motor (FL), and performs control in a manner that the motor rotation speed N_motor (FL) becomes equal to the target rotation speed N_tgt (FL).

Specifically, the torque down amount from the requested torque T_req_1 (FL) is computed by using the rotation speed feedback (F/B) control module 114 so that the motor rotation speed N_motor (FL) can be equal to the target rotation speed N_tgt (FL). The obtained torque down amount is subtracted from the requested torque T_req_1 (FL), and the requested torque T_req_2 (FL) is outputted. For example, the torque down amount for matching the motor rotation speed N_motor(FL) (or tire rotation speed N_wheel(FL)) with the target rotation speed N_tgt(FL) is obtained from PID control using the motor rotation speed N_motor(FL) (or tire rotation speed N_wheel(FL)) and the target rotation speed N_tgt(FL). A gain of the PID control is decided by conformity. In this case, because the motor rotation speed N_motor (FL) varies easily, motor inertia is calculated from a wheel angular acceleration obtained from the wheel speed N_wheel (FL). On the basis of the base rotation speed N_base (FL), which is more stable with respect to variation, the torque down amount is calculated so as to cancel the variation in the angular acceleration. In this manner, the variation in the rotation speed can be suppressed.

The motors of the respective wheels are controlled on the basis of the motor torques T_req_2 (FL, FR, RL, RR) after rotation speed control that have been calculated in the above described way.

The motor torques T_req_2 (FL, FR, RL, RR) after rotation speed control are transmitted to the torque vectoring module 106. The torque vectoring module 106 calculates the torque down amounts T_down (FL, FR, RL, RR) from differences between the final requested torques T_req_2 (FL, FR, RL, RR) and the front-and-rear distribution torques T_req_s (FL, FR, RL, RR). In the next control cycle, the torque vectoring module 106 controls torques of the respective wheels by setting the calculated torque down amounts T_down (FL, FR, RL, RR) as the torque down amounts in the previous control cycle and redistributing a sum of the torque down amounts T_down (FL, FR, RL, RR) to a wheel that is not slipping.

In the above manner, the rotation speed control module 110 independently controls the motors of the respective wheels, and limits the motor rotation speeds of the respective wheels. In this manner, compared with a case where control is performed by torque, the vibration of motors can be suppressed surely, and the responsibility and stability of control can be enhanced. In addition, the torque vectoring module 106 performs redistribution control independently of the rotation speed control, and the torque vectoring module 106 is installed at a higher level than the rotation speed control module 110. Thus, while the rotation speed control is being performed, torque redistribution can be controlled, and while the vibration of the motors is suppressed, torque can be surely distributed. Furthermore, the redistribution results obtained by the torque vectoring module 106 are set as the requested torques to the rotation speed control module 110. In this manner, a slip or vibration due to redistribution can be suppressed by the rotation speed control. Thus, torque can be redistributed without setting the upper limit on the torque, and reduction in driving force can be surely suppressed. Accordingly, it is possible to improve drivability without limiting the differential limiting function, and it is possible to improve drivability even in the case where there is no torque upper limit.

Meanwhile, redistribution control after the rotation speed control may lead to variation in torques due to redistribution, and the motors may vibrate. However, as in the implementation, by performing the rotation speed control after redistribution, the motors do not vibrate and stable control becomes possible.

Next, control of the front-and-rear torque distribution performed by the base distribution calculation module 104 will be described. In the implementation, the torque vectoring module 106 controls redistribution of torques, and the base distribution calculation module 104 controls the base front axis distribution ratio Rb in the case where a slip has been detected.

It is preferable that the front-and-rear torque distribution serving as the base is set to correspond to or be in proximity to load distribution (for example, front wheel load:rear wheel load=5:5) in view of driving stability. However, in view of electric power consumption efficiency, sometimes low electric power consumption can be obtained in the case of biased distribution such as distribution to the front wheels is larger than the rear wheels or distribution to the rear wheels is larger than the front wheels.

Figure 4:
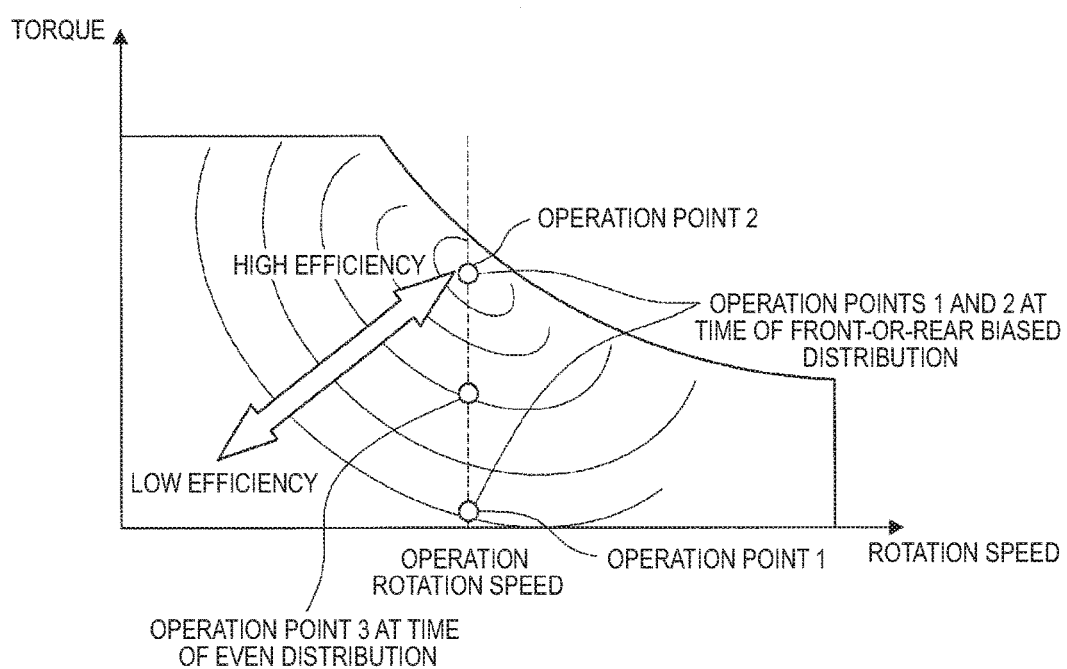
FIG. 4 is a schematic diagram illustrating a relation between a motor rotation speed, a motor torque, and motor efficiency.

FIG. 4 is a schematic diagram illustrating a relation between a motor rotation speed, a motor torque, and motor efficiency. As illustrated in FIG. 4, in the case where a total requested torque having a certain operation rotation speed is ordered and a vehicle is driven with a front-or-rear biased distribution, motors at a high torque side are driven at an operation point 2, and motors at a low torque side are driven at an operation point 1. In this case, a region with higher efficiency than the case of front-and-rear even distribution can be used at the higher torque side of the front-or-rear biased distribution than the case of driving the front and rear motors at an operation point 3 at the time of front-and-rear even distribution. Therefore, loss can be reduced on the whole.

Efficiency is considered as important during ordinary travelling without slipping. Therefore, electric power consumption is reduced to be the minimum by distributing larger torques to the rear wheels than the front wheels according to the implementation. On the other hand, when the slip occurs, the efficiency-oriented distribution ratio is switched to a stability-oriented distribution ratio, and the front wheel torque: the rear wheel torque=5:5 is substantially achieved.

Thereby, it is possible to suppress the electric power consumption to be the minimum during ordinary travelling without slipping, and it is possible to drastically increase vehicle stability in the case where the slip occurs.

Figure 5:
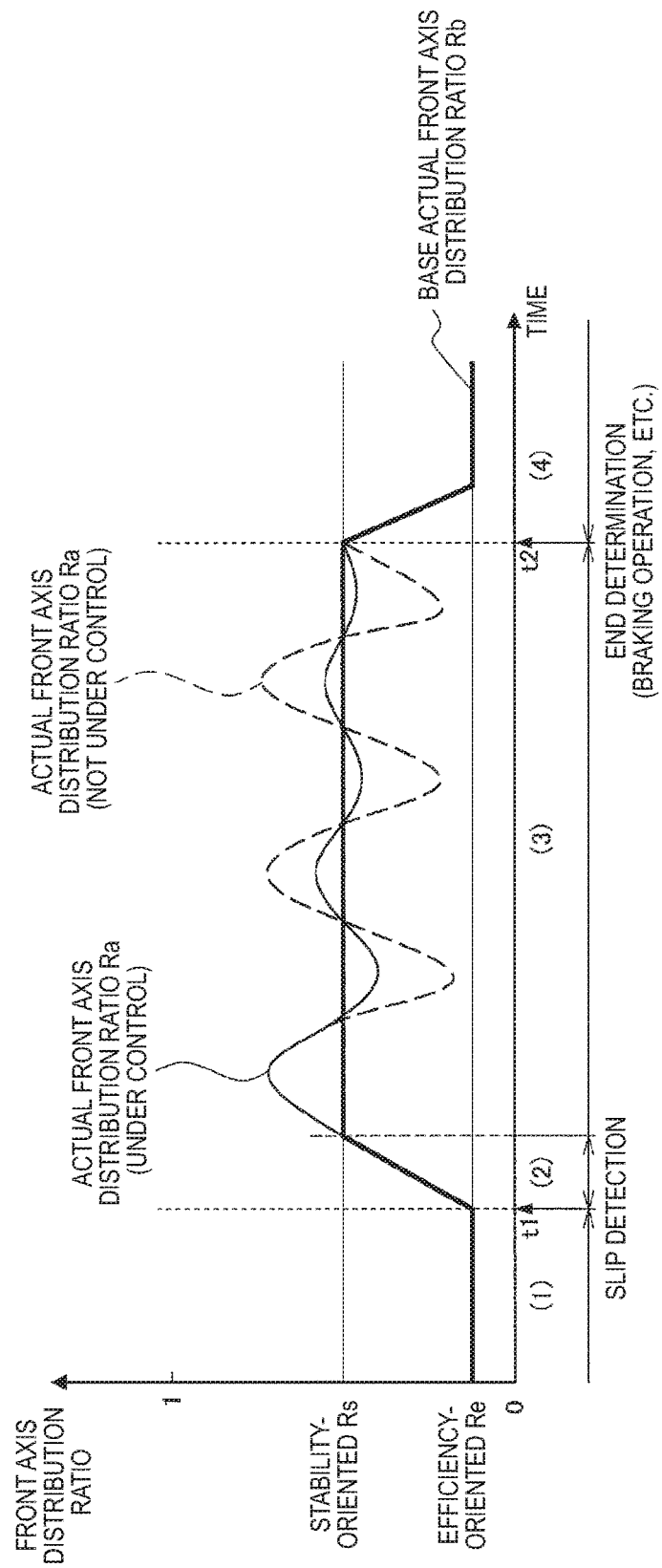
FIG. 5 is a schematic diagram illustrating how a base front axis distribution ratio Rb is changed from an efficiency-oriented front axis distribution ratio Re to an stability-oriented front axis distribution ratio Rs, when a slip occurs.

FIG. 5 is a schematic diagram illustrating how the base front axis distribution ratio Rb is changed from an efficiency-oriented front axis distribution ratio Re to a stability-oriented front axis distribution ratio Rs, when a slip occurs. The base front axis distribution ratio Rb is used by the base distribution calculation module 104 for calculating the front-and-rear distribution torques T_req_s (FL, FR, RL, RR) of the respective wheels. In FIG. 5, the vehicle is in the ordinary travelling state without slipping until time t1, and the front-and-rear torques T_req_s (FL, FR, RL, RR) are calculated from the efficiency-oriented front axis distribution ratio Re. When a slip is detected at the time t1, the front-and-rear torques T_req_s (FL, FR, RL, RR) are calculated from the stability-oriented front axis distribution ratio Rs. When, for example, a braking operation performed by a driver is detected at time t2 and it is determined that the slip state ends, the front-and-rear torques T_req_s (FL, FR, RL, RR) are calculated from the efficiency-oriented front axis distribution ratio Re.

As illustrated in FIG. 5, the efficiency-oriented front axis distribution ratio Re is a value about 0.2, for example. Therefore, about 20% of the requested torques are distributed to the front wheels, and the other 80% of the requested torques are distributed to the rear wheels. The base distribution calculation module 104 distributes the high level requested torques T_req_0 (FL, FR, RL, RR) of the respective wheels to the front and rear wheels in accordance with the front axis distribution ratio Re, and calculates the front-and-rear distribution torques T_req_s (FL, FR, RL, RR). As described above, heavy distribution of the requested torques to the rear wheels increases the efficiency to the maximum, and suppresses the electric power consumption to the minimum. Although the torques are heavily distributed to the rear wheels in view of the efficiency according to the implementation, efficiency-oriented distribution is not limited thereto. For example, torques to be distributed to the front wheels may be increased.

On the other hand, as illustrated in FIG. 5, the stability-oriented front axis distribution ratio Rs is a value about 0.5, for example. Therefore, about 50% of the requested torques are distributed to the front wheels, and the other 50% of the requested torques are distributed to the rear wheels. By evenly distributing the requested torques to the front wheels and the rear wheels as described above, it is possible to improve driving stability. The stability-oriented front axis distribution ratio Rs may be a distribution ratio according to a weight distribution ratio between the front wheels and the rear wheels.

FIG. 5 illustrates the actual front axis distribution ratio Ra in addition to the efficiency-oriented front axis distribution ratio Re and the stability-oriented front axis distribution ratio Rs. The actual front axis distribution ratio Ra that is an actual front axis distribution ratio is calculated by the base distribution calculation module 104 using the following equation. In the following equation, a front axis motor torque may be an average value of a torque of the front left wheel motor and a torque of the front right wheel motor. In a similar way, a rear axis motor torque may be an average value of a torque of the rear left wheel motor and a torque of the rear right wheel motor.

Actual front axis distribution ratio Ra=(front axis motor torque×front axis speed reduction ratio)/ (front axis motor torque×front axis speed reduction ratio+rear axis motor torque×rear axis speed reduction ratio)

In the case where the slip is detected at the time t1, a characteristic of the actual front axis distribution ratio Ra represented by a solid line in FIG. 5 is a characteristic at the time when control is performed in a manner that a sum of the torque down amounts T_down (FL, FR, RL, RR) is redistributed to a wheel that is not slipping and the base front axis distribution ratio Rb is shifted from the efficiency-oriented front axis distribution ratio Re to the stability-oriented front axis distribution ratio Rs. In this way, by redistributing the torque down amounts and shifting the front and rear torque distribution ratio, it is possible to surely suppress vibration due to motor rotation at the time of torque vectoring to the front or rear wheels.

On the other hand, a characteristic of the actual front axis distribution ratio Ra represented by a dotted line in FIG. 5 indicates that control is performed in a manner that a sum of the torque down amounts T_down (FL, FR, RL, RR) is simply redistributed to a wheel that is not slipping in the case where the slip is detected at the time t1. In this case, a torque vectoring amount from the rear wheel to the front wheel becomes large at the time of slipping. Therefore, the torque vectoring amount vibrates, and drivability is decreased. In addition, when the torque down amount or the front-and-rear torque vectoring amount is limited to prevent such a problem, slip suppression performance and vehicle driving power decrease unfortunately.

Therefore, on the basis of the control according to the implementation, the torque down amounts are redistributed and the base distribution ratio is changed in the case where a slip occurs. Accordingly, it is possible to suppress vibration in the front-and-rear torque vectoring, and it is possible to stabilize vehicle behavior.

Specifically, the base distribution calculation module 104 controls the base distribution ratio with reference to the actual front axis distribution ratio Ra. As illustrated in FIG. 5, the base front axis distribution ratio Rb is set to the efficiency-oriented front axis distribution ratio Re before the time t1 when a slip is detected (section (1)). When the slip is detected at the time t1, the base distribution ratio Rb is set to the actual front axis distribution ratio Ra until Ra≥Rs is achieved (section (2)). In other words, since the actual front axis distribution ratio Ra is changed by the above described torque redistribution control, the base distribution ratio Rb is controlled to be the actual front axis distribution ratio Ra in accordance with the change in the actual front axis distribution ratio Ra. Subsequently, after once Ra≥Rs is achieved, the base distribution ratio Rb is set to the stability-oriented front axis distribution ratio Rs (section (3)). Next, when the time t2 comes and end determination is performed, the base distribution ratio Rb is gradually changed from the stability-oriented front axis distribution ratio Rs to the efficiency-oriented front axis distribution ratio Re, and when the base distribution ratio Rb becomes equal to the front axis distribution ratio Re, the front axis distribution ratio Re is maintained (section (4)). Thereby, with reference to the solid line of the actual front axis distribution ratio Ra in FIG. 5, it is possible to surely suppress vibration in the front-and-rear torque vectoring.

FIG. 5 illustrates the distribution ratio by which the torques are biased toward the rear wheels on the basis of the efficiency-oriented front axis distribution ratio Re. In a similar way, the base distribution ratio can be changed also in the case of a distribution ratio by which the torques are biased toward the front wheels on the basis of the efficiency-oriented front axis distribution ratio Re.

Figure 6:
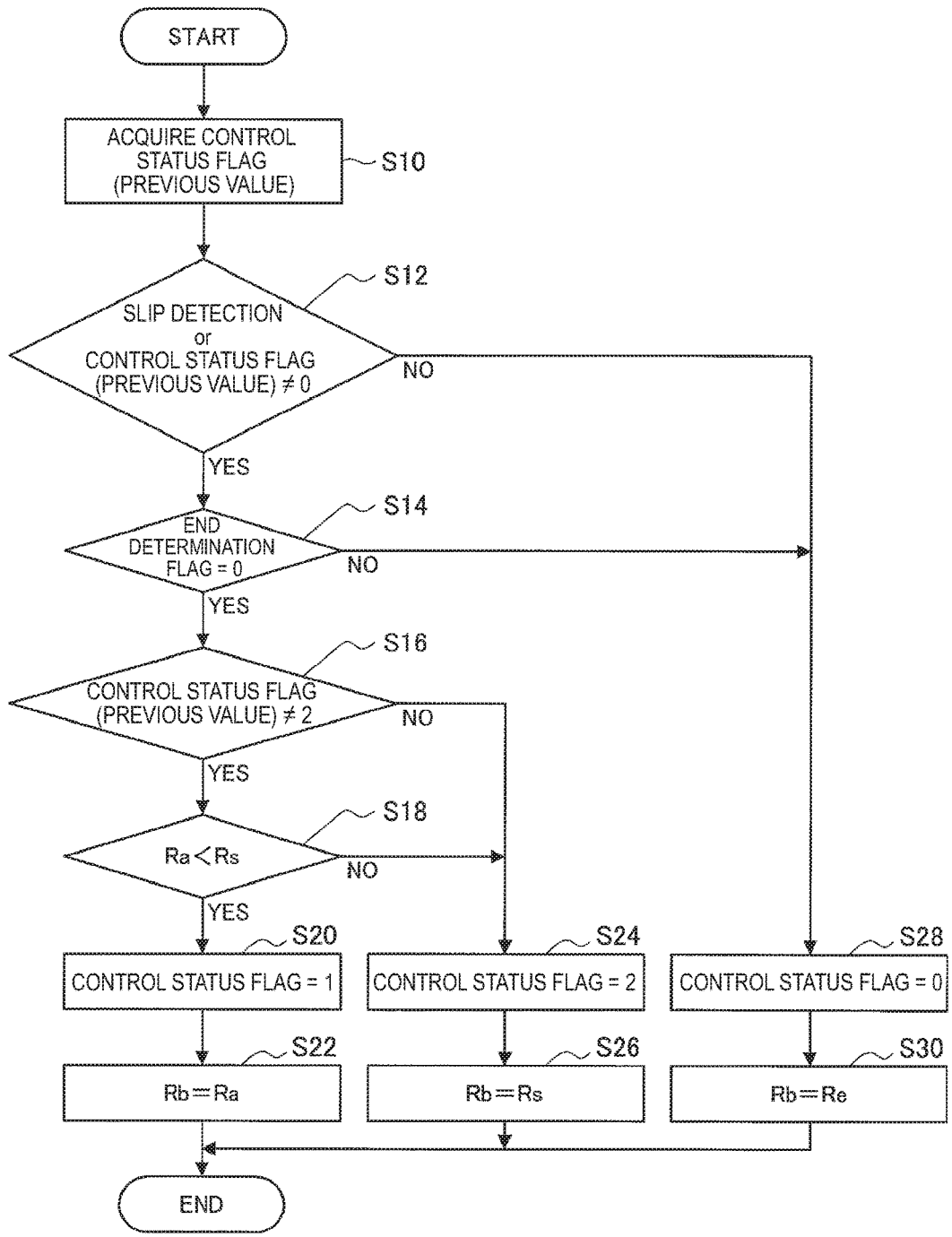
FIG. 6 is a flowchart illustrating a process for switching a base distribution ratio Rb performed by a base distribution calculation module 104 as illustrated in FIG. 4.

FIG. 6 is a flowchart illustrating a process for switching a base distribution ratio Rb performed by the base distribution calculation module 104 as illustrated in FIG. 4. First, in Step S10, a control status flag (previous value) is acquired. The control status flag is a flag indicating a control status of the base distribution ratio Rb. The control status flag is set to "0" in a state where the base distribution ratio Rb is controlled toward the efficiency-oriented front axis distribution ratio Re. The control status flag is set to "2" in a state where the base distribution ratio Rb is controlled toward the stability-oriented front axis distribution ratio Rs. The control status flag is set to "1" in a state where the base distribution ratio Rb is controlled toward the actual front axis distribution ratio Ra.

In the next Step S12, it is determined whether a slip has been detected or whether the control status flag (previous value) is a value other than 0. When the slip has been detected in Step S12 or the control status flag (previous value) is a value other than 0, the process proceeds to Step S14.

In Step S14, it is determined whether end determination has been performed. In the case where the end determination has not been performed (end determination flag=0), the process proceeds to Step S16. In Step S16, it is determined whether the value of the control status flag (previous value) is a value other than 2. In the case where the control status flag (previous value) is a value other than 2, the process proceeds to Step S18.

In Step S18, it is determined whether Ra<Rs. In the case where Ra<Rs, the process proceeds to Step S20, and the control status flag is set to "1". After Step S20, the process proceeds to Step S22, and the base front axis distribution ratio Rb is set to the actual front axis distribution ratio Ra.

On the other hand, in the case where the value of the control status flag (previous value) is 2 in Step S16 or Ra≥Rs in Step S18, the process proceeds to Step S24 and the control status flag is set to "2". After Step S24, the process proceeds to Step S26, and the base front axis distribution ratio Rb is set to the stability-oriented front axis distribution ratio Rs.

In the case where the slip has not been detected in Step S12 or the control status flag (previous value) is 0, the process proceeds to Step S28. The process proceeds to Step S28 also in the case where the end determination has been performed (end determination flag=1) in Step S14. The control status flag is set to "0" in Step S28, and the base front axis distribution ratio Rb is set to the efficiency-oriented front axis distribution ratio Re in the next Step S30.

Figure 7:
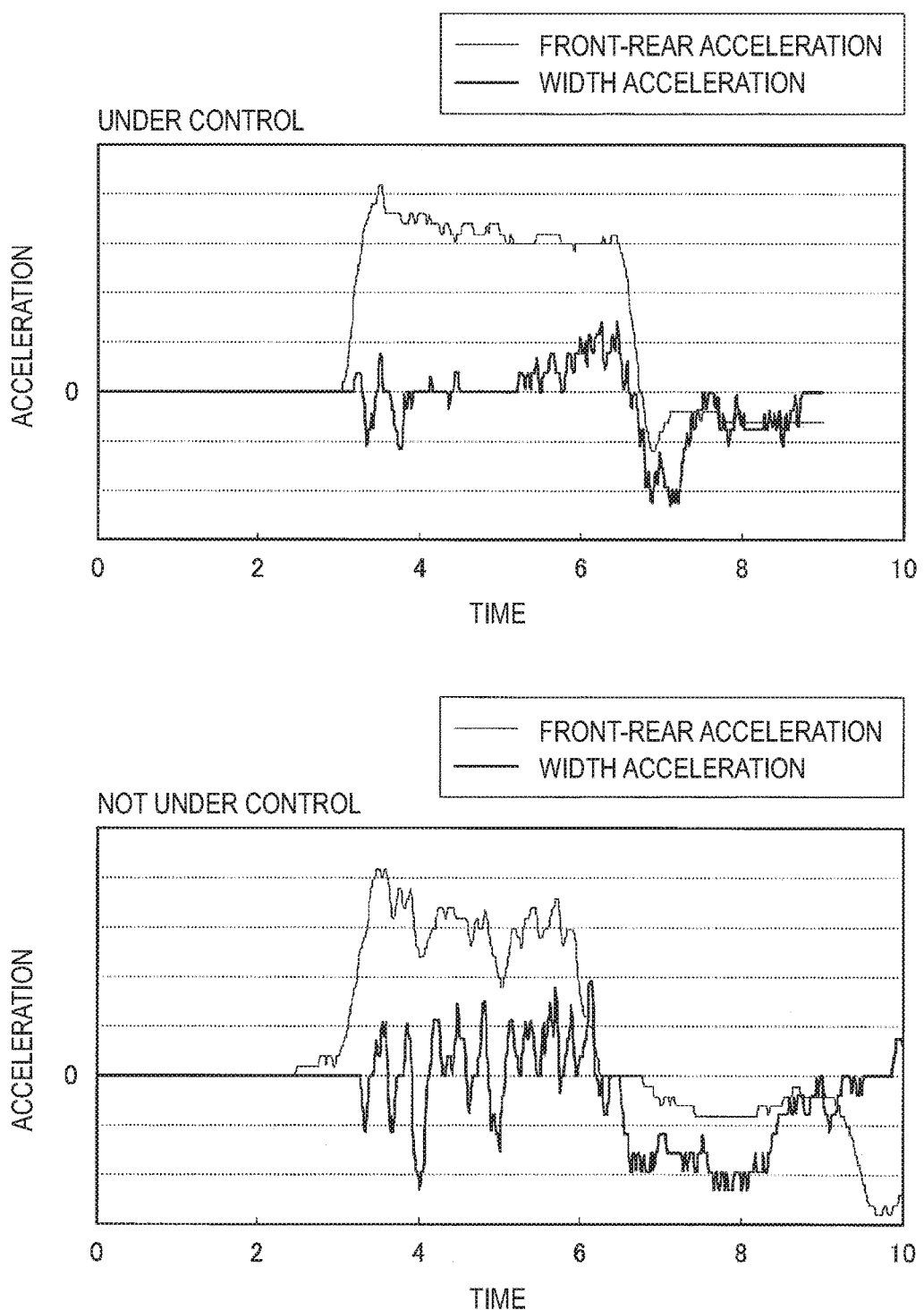
FIG. 7 is characteristic diagrams illustrating effects obtained by control according to the implementation.

FIG. 7 is characteristic diagrams illustrating effects obtained by control according to the implementation. FIG. 7 illustrates how front-rear acceleration and width acceleration change as the time elapses in the case where the vehicle travels on a road (split friction road) having different friction between left wheels and right wheels. The upper side characteristic diagram of FIG. 7 illustrates a case where control is performed according to the implementation. Specifically, the upper side characteristic diagram of FIG. 7 illustrates a case where control is performed in a manner that a sum of the torque down amounts T_down (FL, FR, RL, RR) is redistributed to a wheel that is not slipping and the base front axis distribution ratio Rb is shifted from the efficiency-oriented front axis distribution ratio Re to the stability-oriented front axis distribution ratio Rs. On the other hand, for comparison, the lower side characteristic diagram of FIG. 7 illustrates a case where control according to the implementation is not performed. Specifically, the lower side characteristic diagram of FIG. 7 illustrates a case where control is simply performed in a manner that a sum of the torque down amounts T_down (FL, FR, RL, RR) is redistributed to a wheel that is not slipping.

As illustrated in the lower side characteristic diagram of FIG. 7, there are too much front-and-rear torque vectoring amounts in the case where the control according to the implementation is not performed. Therefore, both the front-rear acceleration and the width acceleration vibrate. On the other hand, by adjusting the base distribution ratio according to the implementation, it is possible to suppress the vibration in both the front-rear acceleration and the width acceleration.

As described above, according to the implementation, the torque vectoring module 106 controls redistribution of torques, and the base distribution calculation module 104 controls the base front axis distribution ratio Rb in the case where the slip is detected. Therefore, it is possible to surely suppress vibration in accordance with torque vectoring.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A vehicle control device comprising:
a slip determination module that determines a slip of each of a front left wheel, a front right wheel, a rear left wheel, and a rear right wheel;
a base distribution calculation module that calculates a base distribution torque to be distributed to the front and rear wheels on the basis of requested torques and a base distribution ratio of torques between the front and rear wheels, and changes the base distribution ratio on the basis of a result of slip determination performed by the slip determination module when the slip is detected;
a rotation speed control module that decreases the base distribution torque on the basis of the result of slip determination performed by the slip determination module, in a manner that a rotation speed of a slipping wheel that is slipping becomes equal to a target rotation speed; and
a torque vectoring module that redistributes a decreased torque amount of the slipping wheel that is slipping to the base distribution torque of non-slipping wheels that are not slipping,
wherein the base distribution calculation module changes the base distribution ratio of torques based on an actual distribution ratio of torques, between the front and rear wheels, before and after the decrease of the base distribution torque.

2. The vehicle control device according to claim 1, wherein the base distribution calculation module sets the base distribution ratio to an efficiency-oriented distribution ratio before the slip is detected, and changes the base distribution ratio into a stability-oriented distribution ratio after the slip is detected.

3. The vehicle control device according to claim 2, wherein the torques are distributed while biased toward the front wheels or the rear wheels in a case of the efficiency-oriented distribution ratio.

4. The vehicle control device according to claim 3, wherein the torques are distributed on the basis of a weight distribution proportion in a case of the stability-oriented distribution ratio.

5. The vehicle control device according to claim 3, wherein the base distribution calculation module sets the base distribution ratio to the actual distribution ratio of torques between the front and rear wheels until the actual distribution ratio reaches the stability-oriented distribution ratio after the slip is detected.

6. The vehicle control device according to claim 3, wherein the base distribution calculation module sets the base distribution ratio to the stability-oriented distribution ratio after the actual distribution ratio of torques between the front and rear wheels reaches the stability-oriented distribution ratio after the slip is detected.

7. The vehicle control device according to claim 3, wherein the base distribution calculation module changes the base distribution ratio back to the efficiency-oriented distribution ratio after slip end determination.

8. The vehicle control device according to claim 2, wherein the torques are distributed on the basis of a weight distribution proportion in a case of the stability-oriented distribution ratio.

9. The vehicle control device according to claim 2, wherein the base distribution calculation module sets the base distribution ratio to the actual distribution ratio of torques between the front and rear wheels until the actual distribution ratio reaches the stability-oriented distribution ratio after the slip is detected.

10. The vehicle control device according to claim 2, wherein the base distribution calculation module sets the base distribution ratio to the stability-oriented distribution ratio after the actual distribution ratio of torques between the front and rear wheels reaches the stability-oriented distribution ratio after the slip is detected.

11. The vehicle control device according to claim 2, wherein the base distribution calculation module changes the base distribution ratio back to the efficiency-oriented distribution ratio after slip end determination.

12. The vehicle control device according to claim 1, wherein the torque vectoring module acquires the base distribution torque of the front and rear wheels, and adds the decreased torque amount to the base distribution torque of the non-slipping wheels.

13. The vehicle control device according to claim 12, wherein, with regard to the non-slipping wheels, the torque vectoring module evenly redistributes, to the non-slipping wheels, a value obtained by dividing a sum of the decreased torque amount of the slipping wheel by a number of the non-slipping wheels.

14. The vehicle control device according to claim 1, wherein for each control cycle, the torque vectoring module
calculates a sum of decreased torque amounts in a current control cycle, wherein the decreased torque amounts correspond to at least two slipping wheels in a previous control cycle, and
redistributes, in the current control cycle, the sum of the decreased torque amounts to the base distribution torque of each of the non-slipping wheels that are not slipping in the current control cycle.

15. A vehicle control method comprising:
determining a slip of each of wheels;
calculating a base distribution torque to be distributed to front and rear wheels on the basis of requested torques and a base distribution ratio of torques between the front and rear wheels, and changing the base distribution ratio on the basis of a result of the slip determination when the slip is detected;
decreasing the base distribution torque on the basis of the result of the slip determination in a manner that a rotation speed of a slipping wheel that is slipping becomes equal to a target rotation speed;
redistributing a decreased torque amount of the slipping wheel that is slipping to the base distribution torque of non-slipping wheels that are not slipping: and
changing the base distribution ratio of torques based on an actual distribution ratio of torques, between the front and rear wheels, before and after the decrease of the base distribution torque.

16. A vehicle control device comprising
circuitry configured to
determine a slip of each of a front left wheel, a front right wheel, a rear left wheel, and a rear right wheel;
calculate a base distribution torque to be distributed to the front and rear wheels on the basis of requested torques and a base distribution ratio of torques between the front and rear wheels, and change the base distribution ratio on the basis of a result of the slip determination when the slip is detected;
decrease the base distribution torque on the basis of the result of the slip determination in a manner that a rotation speed of a slipping wheel that is slipping becomes equal to a target rotation speed;
redistribute a decreased torque amount of the slipping wheel that is slipping to the base distribution torque of non-slipping wheels that are not slipping: and
change the base distribution ratio of torques based on an actual distribution ratio of torques, between the front and rear wheels, before and after the decrease of the base distribution torque.

* * * * *